US006944728B2

(12) United States Patent  (10) Patent No.: US 6,944,728 B2
Calderon et al.  (45) Date of Patent: Sep. 13, 2005

(54) INTERLEAVING MEMORY ACCESS

(75) Inventors: Juan-Carlos Calderon, Fremont, CA (US); Jean-Michel Caia, San Francisco, CA (US); Vivek Joshi, Sunnyvale, CA (US); Jing Ling, Fremont, CA (US); Anguo T. Huang, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 178 days.

(21) Appl. No.: 10/329,283

(22) Filed: Dec. 23, 2002

(65) Prior Publication Data

US 2004/0123056 A1 Jun. 24, 2004

(51) Int. Cl.$^7$ ............................................... G06F 12/00
(52) U.S. Cl. ........................ 711/157; 711/105; 710/53
(58) Field of Search ................................ 711/157, 105; 710/53; 709/213, 238; 370/363

(56) References Cited

U.S. PATENT DOCUMENTS

| 5,546,543 | A | * | 8/1996 | Yang et al. | ................. 709/235 |
| 5,572,691 | A | * | 11/1996 | Koudmani | ...................... 711/5 |
| 5,881,313 | A | * | 3/1999 | Ramakrishnan et al. | ...... 710/40 |
| 6,711,170 | B1 | * | 3/2004 | Brown | .................... 370/395.7 |
| 6,763,028 | B2 | * | 7/2004 | Fujii | .......................... 370/412 |
| 6,804,731 | B1 | * | 10/2004 | Chang et al. | ................. 710/53 |
| 2002/0009075 | A1 | * | 1/2002 | Fesas | ......................... 370/363 |

* cited by examiner

Primary Examiner—Hiep T. Nguyen
(74) Attorney, Agent, or Firm—Fish & Richardson P.C.

(57) ABSTRACT

Interleaving memory access includes enabling data included in a receive flow of data to be stored in a first memory bank, enabling data included in a transmit flow of data to be stored in a second memory bank, and alternating access of data in the first memory bank with access of data in the second memory bank.

36 Claims, 4 Drawing Sheets

INTERLEAVING MEMORY ACCESS

BACKGROUND

A memory of a communications system may be divided into two or more sections (banks). A processing mechanism included in the communications system may access alternate sections immediately, without idling, while the memory completes an access to one section before beginning another memory access. This type of memory access is generally called memory interleaving.

DESCRIPTION

Figure 1:
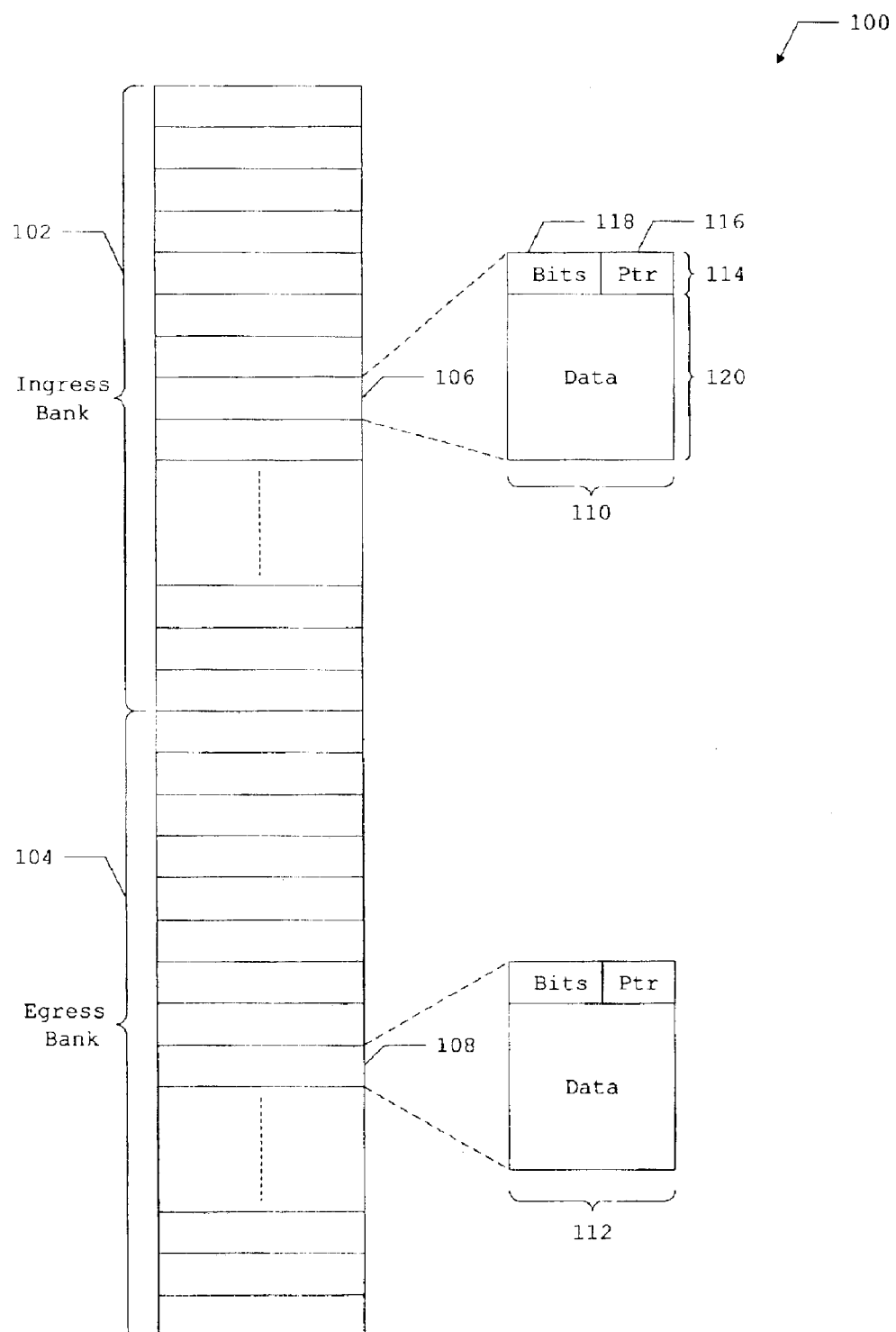
FIG. 1 shows an example memory configuration.

Referring to FIG. 1, an example double data rate (DDR) synchronous dynamic random access memory (SDRAM) 100 includes an ingress bank 102 and an egress bank 104. Two or more data flows (e.g., a receive data flow of received data and a transmit data flow of data to transmit) passing through the memory 100 may be interleaved by alternately processing the data flows through the ingress bank 102 and the egress bank 104. Accesses, e.g., read accesses and write accesses, to the ingress bank 102 and the egress bank 104 can be interleaved such that read accesses (or write accesses) can alternate between the ingress bank 102 and the egress bank 104 and write accesses (or read accesses if write accesses were first alternated) can alternate between the ingress bank 102 and the egress bank 104. Groups of read accesses and groups of write accesses may continue to alternate in a pre-programmed manner.

In this way, read and write accesses to the ingress bank 102 and the egress bank 104 can be fully independent. Memory access can be deterministic, not dependent on data flow patterns, and follow a repetitive time-base that may be pre-determined and easy to program into the memory 100 and/or into a processor, a memory controller, or other mechanism controlling the memory 100. Additionally, access to the memory 100 may be continuous and more efficient than other memory access techniques, such as techniques that rely on statistical methods of rearranging memory access to avoid consecutive reads or writes to the same memory bank.

Generally, the ingress bank 102 handles data transmission while the egress bank 104 handles data reception such that the memory 100 can function in or as a full duplex device capable of simultaneously processing data in two directions. The banks 102 and 104 are each divided into N partitions 106 and 108 of M bytes each, where N and M each represent positive whole numbers. (The partitions 106 and 108 are illustrative partitions for the ingress bank 102 and egress bank 104, respectively.) N and M may or may not be equal. In this example, M equals sixty-four.

In this example, each of the sixty-four byte partitions 106 and 108 includes eight words 110 and 112, respectively, of eight bytes each. The words 110 and 112 each include control information and data. For simplicity, the control information and data that may be included in the partitions 106 and 108 are discussed only with reference to the partition 106 included in the ingress bank 102 although all of the partitions in the ingress bank 102 and the egress bank 108 may include control information and data as described for the partition 106.

One word or more words, the first word in this example, of the partition 106 stores control information 114. The control information 114 includes address information 116 and control bits 118 for data 120 included in the same partition as the control information. The address information 116 includes a relative positioning of the partition 106 in the ingress bank 102 (in the egress bank 104 for partitions included in the egress bank 104). For example, the address information may include a pointer to the next partition in the ingress bank 102 (or the egress bank 104 for words included in a partition in the egress bank 104).

The control bits 118 indicate a positioning of the data 120 stored in the same partition as the control bits relative to other related data included in the ingress bank 102 (or the egress bank 104 for words included in the egress bank 104). For example, the control bits 118 include bits indicating a start of a packet, an end of a packet, etc.

The remaining words of the partition 106, seven words in this example, can store the data 120. The data 120 may include packets, cells, and/or other types of similar information.

The data 120 may include blocks of data generally referred to as packets. The unit of packet data could include an entire network packet (e.g., an Ethernet packet) or a portion of such a packet. The packets may have a variable or a fixed size. Packets with a fixed size are called cells. Each sent packet may be part of a packet stream, where each of the packets, called a segment, included in the packet stream fits together to form a contiguous stream of data. The data 120 may include partial or complete packets. The control bits 118 may include positioning information for each packet or partial packet included in the data 120.

The data 120 may also or instead include cells. Generally, cells refer to packets of a fixed size, such as data communicated using asynchronous transfer mode (ATM).

The data 120 may store data differently depending on the type of data flows to/from the memory 100. For packet-to-packet data flows, the partition 106 may store fifty-six bytes of data. The number of bytes stored in the last partition of a packet (from one to fifty-six) may be indicated in the address information 116. For packet-to-cell, cell-to-packet, and cell-to-cell connections, the data 118 may include an entire ATM cell (typically using fifty-two bytes of the seven words of data space).

Figure 2:
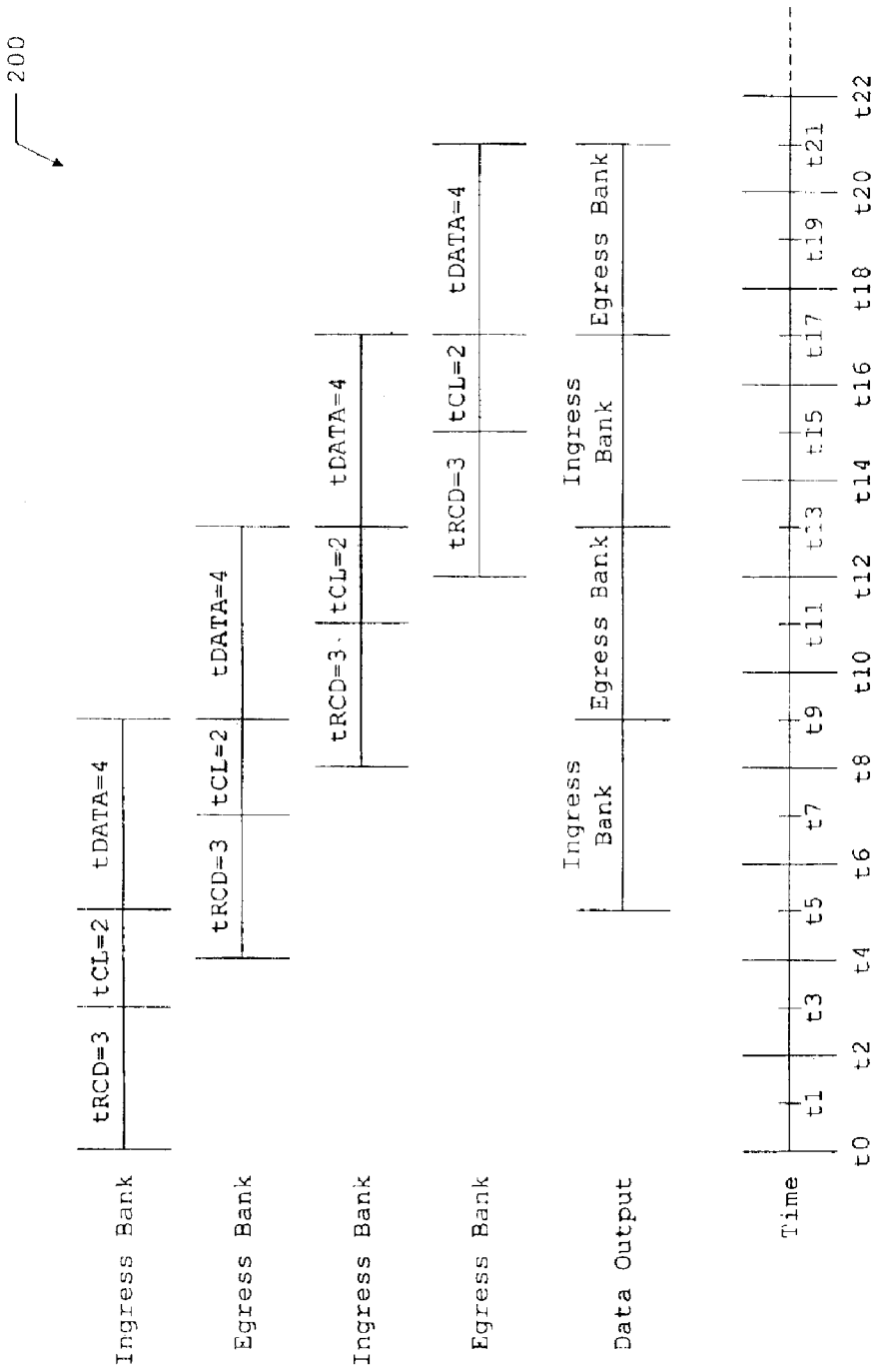
FIG. 2 is an example timing diagram.

Referring to FIG. 2, an example timing diagram 200 shows an example of accessing the memory 100 of FIG. 1 for consecutive reads with two bank interleaving. Although the timing diagram 200 is described with reference to the elements included in the example memory 100 of FIG. 1, this or a similar timing may exist for the memory 100 or another, similar memory system.

At time t0, the ingress bank 102 receives a read access command, the request typically made by a processor or memory controller included in the same computing system as the memory 100. In turn, the ingress bank 102 reads data through row and bank activation time (tRCD), column access time (tCL), and data burst time (tDATA). Time tRCD, the time it takes to open a row or partition in the bank before a read or write command can be issued, begins at time t0 and lasts for three clock cycles until time t3. Time tCL, the time between the issuing of the read or write command to the open row or partition and the output of data from the open row or partition, begins at time t3 and lasts for two clock cycles until time t5. Data is read from the ingress bank 102

(e.g., be output from the ingress bank 102) in data burst tDATA lasting four clock cycles from time t5 to time t9. The data burst tDATA lasts four cycles in this example using a burst size of eight words, although the burst size may include any positive whole number of bits and/or bytes.

The clock cycle times shown for tRCD, tCL, and tDATA are example amounts of time. Other timing scenarios may have different timings for one or more of these times such as differing numbers of clock cycles for the various operations, differing units of timing such as unit of time such as seconds, microseconds, or other unit of time, or other types of similar differences.

Consecutive row/bank activation commands may be alternately issued to different banks. During the tCL time between time t3 and time t5, a data read may begin with tRCD time for a second read, the first read command for the egress bank 104. Read requests may continue overlapping and alternating between the ingress bank 102 and the egress bank 104. In this way, interleaving the ingress and egress data flows (excepting any initial setup time for the first read and/or write may allow a continuous output of data from the memory 100 with an efficiency of 100% as data is continuously read in tDATA time from either the ingress bank 102 or the egress bank 104 starting at time t5 as shown in the data output section of the timing diagram 200.

The timing diagram 200 is discussed for consecutive reads, but the timing would be the same or similar (e.g., having different clock cycle times for the different operations, additional time for switching between reads and writes, etc.) for consecutive writes or for a mixture of consecutive reads and writes.

The efficiency of data flows may be less than 100% when read and write commands are both issued because efficiency is typically reduced when switching from read to write and from write to read. Interleaving pre-determined numbers of reads and writes may decrease efficiency from 100% but still achieve a high efficiency level. Any positive whole number of read bursts may be alternated with any positive whole number of write bursts.

For example, by interleaving four read bursts (four bursts of eight, sixty-four byte words) followed by four write bursts (four bursts of eight, sixty-four byte words), efficiency can be 8/9 (88.9%), data is read/written eight out of nine clock cycles with switching between reads and writes taking up one clock cycle. In contrast, without bank interleaving, two consecutive reads may require access to the same bank in which case the total time to read a burst of eight words equals nine clock cycles (tRCD+tCL+tDATA) with an efficiency of 4/9 (44.4%).

The timing diagram 200 shows access of the ingress bank 102 before the egress bank 104 though the egress bank 104 may be accessed first. Four read accesses are shown in the timing diagram 200, two for each bank, but there may be more or fewer read and/or write accesses, with any additional reads/writes following the same general timing pattern.

Figure 3:
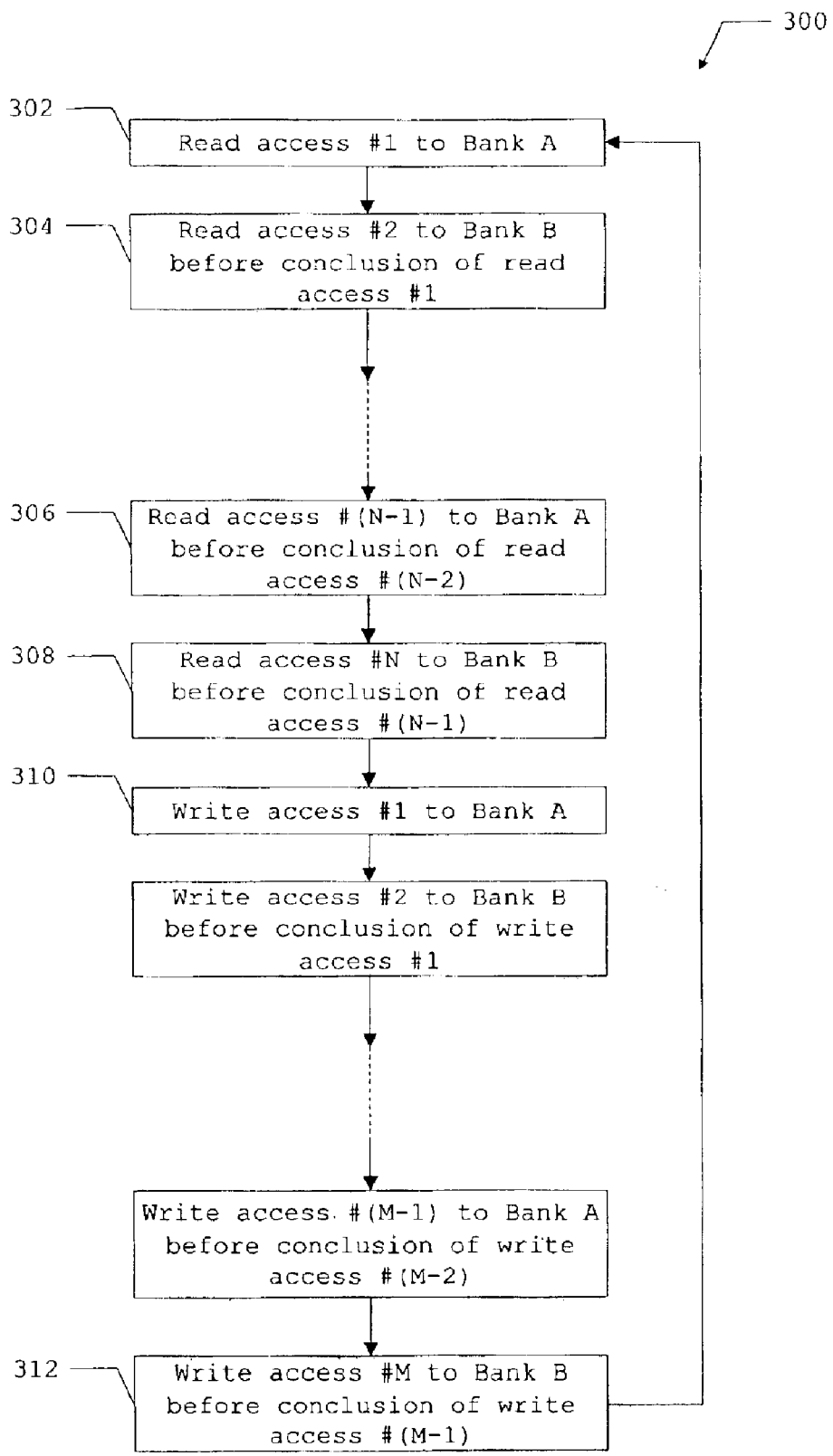
FIG. 3 shows an example process of accessing data.

FIG. 3 shows an example process 300 of accessing the memory 10.0 of FIG. 1 using bank interleaving and an alternating series of read and write accesses. Although the process 300 is described with reference to the elements included in the example memory 100 of FIG. 1 and the timing diagram 200 of FIG. 2, this or a similar process may be performed using the memory 100 or another, similar memory system and/or using other, similar timing. For example, more than two banks may be interleaved, writes may be performed before reads, etc.

The process 300 begins with a first read access 302 to bank A. Bank A may include either the ingress bank 102 or the egress bank 104 while bank B includes the other bank. The first read access may include tRCD, tCL, and tDATA similar to the timing described with reference to the timing diagram 200. A second read access 304 to bank B begins before the conclusion of the first read access to bank A, e.g., during tCL time of the first read access. Read accesses can continue in this way, alternating between read accesses to bank A and to bank B, through a second to last (N−1) read access 306 to bank A and a last (N) read access 308 to bank B, where N equals any positive whole number (including two, in which case the second read access 304 would be the last read access). The last read access may be to either bank A or to bank B.

After or during the last read access, the process 300 continues with a first write access 310 to bank A. The first write access may begin before the conclusion of the last read access, although, typically, switching from read to write takes at least one cycle (or some other amount of time) that may mean beginning the first write access after tDATA time for the last read access. Interleaved write accesses continue similar to that described for read accesses, alternating between writes to bank A and to bank B. After or during a last (M) write access 312, where M equals any positive whole number and where M may equal N, the process 300 can continue with another first read access 302. Switching from write to read typically takes at least one cycle (or some other amount of time), so the first read access (which is not technically a first read access but the first read access in a new series of read accesses) may begin after the last write access.

A process similar to the process 300 may be implemented for a memory system including more than two memory banks. In that case, memory accesses may alternate among all the memory banks where no two consecutive accesses are to the same memory bank. The memory banks may be accessed in a repeating, pre-determined order or in an order determined on the fly.

Figure 4:
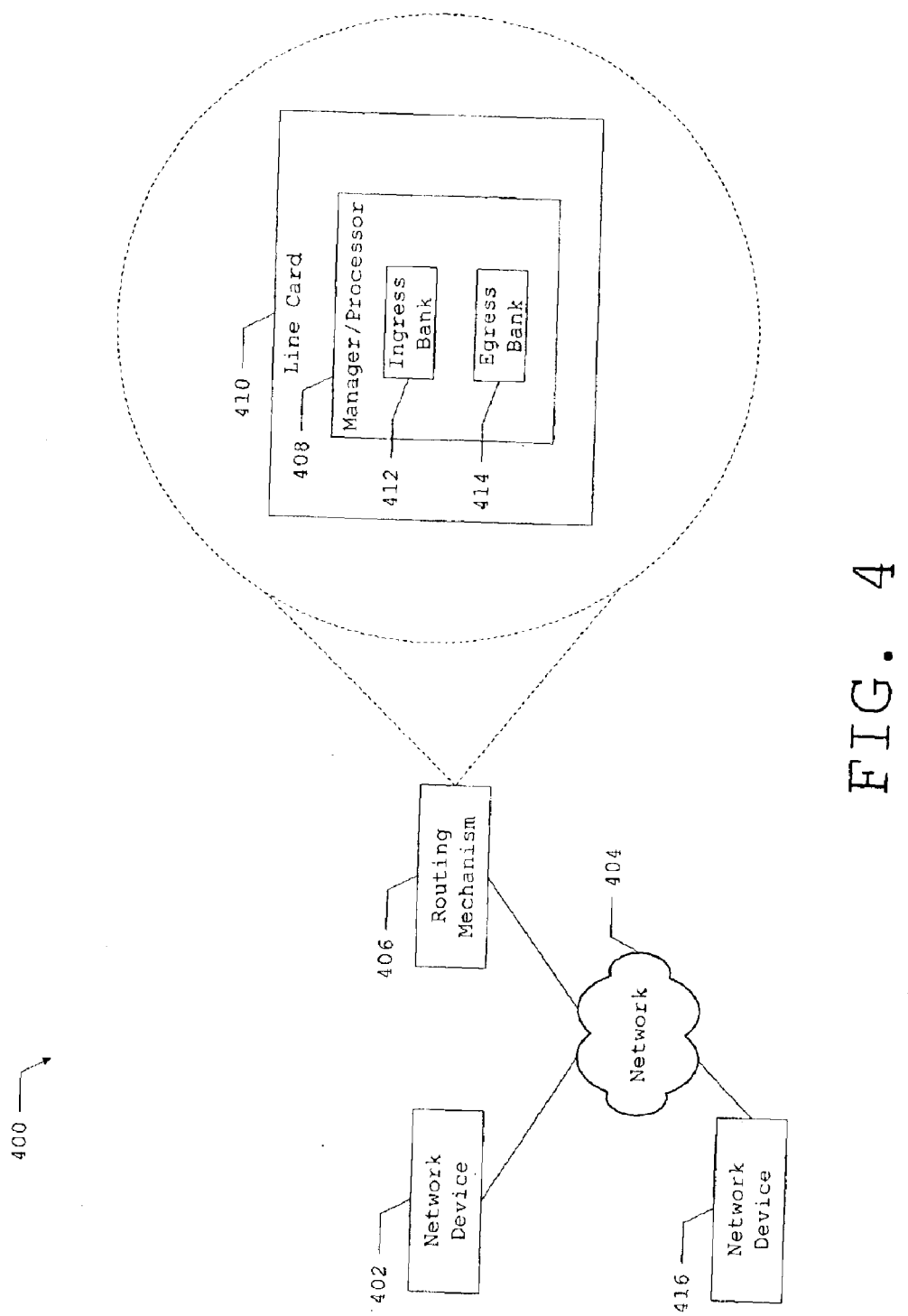
FIG. 4 shows an example communications system.

Referring to FIG. 4, an example communications system 400 includes a full duplex routing mechanism 406 that can help route traffic through a network 404 to and from network devices such as first and second network devices 402 and 416. The routing mechanism 406 includes a traffic manager or network processor 408 that includes a line card 410. The line card 410 includes an ingress bank 412 and an egress bank 414 that may be implemented similar to the banks described above. The routing mechanism 406 can integrate receive and transmit functions such that data in the ingress direction is stored in the ingress bank 412 and data in the egress direction is stored in the egress bank 414. The routing mechanism 406 can access the banks 412 and 414 by performing time division multiplexing between the ingress bank 412 and the egress bank 414 so as to perform bank interleaving in a deterministic way.

The elements described can be implemented in a variety of ways.

The system 400 may include a network system, a computer system, a high integration input/output (I/O) subsystem on a chip, or other similar type of communication, machine, computing, or processing system.

The network devices 402 and 416 can each include any mechanism or device capable of communicating with the network 404. Examples of the network device 402 include workstations, stationary personal computers, mobile personal computers, servers, personal digital assistants, pagers, telephones, and other similar mechanisms and devices.

The routing mechanism 406 can include any communications device capable of directing information to and/or from the network 404. Examples of the routing mechanism 406 include devices capable of forwarding network traffic and/or making decisions on where to send network traffic on its way to its destination such as router devices, traffic shapers, combination router and traffic shapers, switches, and other similar devices.

The network 404 can include any kind and any combination of networks such as an Internet, a local area network (LAN), a wide area network (WAN), a private network, a public network, or other similar network. Communications through the network 404 may be secured with a mechanism such as IP security (IPsec), Transport Layer Security/Secure Socket Layer (TLS/SSL), wireless TLS (WTLS), secure Hypertext Transfer Protocol (S-HTTP), or other similar security mechanism.

The line card 410 can include any processing mechanism (software, hardware, or a combination of the two) capable of providing a transmitting/receiving port and accepting and buffering data for transmission to another mechanism or device. A port generally refers to a pathway into and/or out of a computer or network device. For example, serial and parallel ports on a personal computer are external sockets for plugging in communications lines, modems and printers, and network adapters include ports (Ethernet, Token Ring, etc.) for connection to a local area network (LAN) or other public-or private network. The line card 410 may include a printed circuit board, for example, and may plug into a switch, a router, or other communications device, such as the routing mechanism 406.

The manager/processor 408 can include any memory mechanism capable of storing data in two or more memory banks. The manager/processor 408 may include one storage mechanism, e.g., one RAM chip, or any combination of storage mechanisms, e.g., multiple RAM chips. For example, memory may include SDRAM. SDRAM generally refers to a type of DRAM that can run at much higher clock speeds than conventional memory. DDR-SDRAM generally refers to a type of SDRAM that supports data transfers on both edges of each clock cycle (the rising and falling edges), effectively doubling the memory's data throughput.

Data can be communicated between elements on communication links. The communication links can include any kind and any combination of communication links such as buses (of any type and size), physical ports, modem links, Ethernet links, cables, point-to-point links, infrared connections, fiber optic links, wireless links, cellular links, Bluetooth, satellite links, and other similar links. Additionally, each of the communication links may include one or more individual communication links.

Furthermore, the system 400 is simplified for ease of explanation. The system 400 may include more or fewer additional elements such as networks, communication links, proxy servers, hubs, bridges, switches, routers, processors, traffic managers, storage locations, line cards, firewalls or other security mechanisms, Internet Service Providers (ISPs), and other elements.

The techniques described here are not limited to any particular hardware or software configuration; they may find applicability in any computing or processing environment. The techniques may be implemented in hardware, software, or a combination of the two. The techniques may be implemented in programs executing on programmable machines such as mobile computers, stationary computers, personal digital assistants, and similar devices that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program may be implemented in a high level procedural or object oriented programming language to communicate with a machine system. However, the programs can be implemented in assembly or machine language, if desired. In any case, the language may be a compiled or interpreted language.

Each such program may be stored on a storage medium or device, e.g., compact disc read only memory (CD-ROM), hard disk, magnetic diskette, or similar medium or device, that is readable by a general or special purpose programmable machine for configuring and operating the machine when the storage medium or device is read by the computer to perform the procedures described in this document. The system may also be considered to be implemented as a machine-readable storage medium, configured with a program, where the storage medium so configured causes a machine to operate in a specific and predefined manner.

Other embodiments are within the scope of the following claims.

What is claimed is:

1. A method comprising:
    enabling data included in a receive flow of data to be stored in a first memory bank;
    enabling data included in a transmit flow of data to be stored in a second memory bank, wherein the second memory bank is segregated from the first memory bank; and
    alternating access of data in the first memory bank with access of data in the second memory bank.

2. The method of claim 1 further comprising
    alternating a pre-determined number of read access requests between the first memory bank and the second memory bank, and
    alternating a pre determined number of write access requests between the first memory bank and the second memory bank.

3. The method of claim 1 further comprising, after a last write request to one of the memory banks, alternating between a pre determined number of read access requests to the memory banks and a pre determined number of write access requests to the memory banks.

4. The method of claim 1 further comprising
    alternating only read requests and no write requests when alternating read requests, and
    alternating only write requests and no read requests when alternating write requests.

5. The method of claim 1 further comprising ignoring data flow patterns to and from the memory banks in alternating requests to the memory banks.

6. The method of claim 1 in which the data includes packet data.

7. The method of claim 1 further comprising providing a routing mechanism to include the first memory bank and the second memory bank.

8. The method of claim 1 further comprising enabling data to be stored in one of the memory banks while data is processed is in the other one of the memory banks.

9. An article comprising a machine accessible medium which stores executable instructions, the instructions causing a machine to:

enable data included in a receive flow of data to be stored in a first memory bank;

enable data included in a transmit flow of data to be stored in a second memory bank, wherein the second memory bank is segregated from the first memory bank; and alternate access of data in the first memory bank with access of data in the second memory bank.

10. The article of claim 9 further causing a machine to alternate a pre determined number of read access requests between the first memory bank and the second memory bank, and alternate a pre determined number of write access requests between the first memory bank and the second memory bank.

11. The article of claim 9 further causing a machine to, after a last write request to one of the memory banks, alternate between a pre determined number of read access requests to the memory banks and a pre determined number of write access requests to the memory banks.

12. The article of claim 9 further causing a machine to alternate only read requests and no write requests when alternating read requests, and alternate only write requests and no read requests when alternating write requests.

13. The article of claim 9 further causing a machine to ignore data flow patterns to and from the memory banks in alternating requests to the memory banks.

14. The article of claim 9 in which the data includes packet data.

15. The article of claim 9 further causing a machine to provide a routing mechanism to include the first memory bank and the second memory bank.

16. The article of claim 9 further causing a machine to enable data to be stored in one of the memory banks while data is processed is in the other one of the memory banks.

17. A method comprising:

enabling issuance of a plurality of read requests alternately issued to a first memory bank storing data of a receive data flow and to a second memory bank storing data of a transmit data flow, wherein the second memory bank is segregated from the first memory bank;

enabling, after issuance of the plurality of read requests, issuance of a plurality of write requests alternately issued to the first memory bank and to the second memory bank; and enabling a repeating series of issuing a plurality of read requests alternately issued to the first memory bank and to the second memory bank and issuing a plurality of write requests alternately issued to the first memory bank and to the second memory bank.

18. The method of claim 17 further comprising ignoring data flow patterns to and from the memory banks in issuing requests to the memory banks.

19. The method of claim 17 further comprising enabling a request to be issued to one of the memory banks before a request at the other one of the memory banks has completed processing.

20. The method of claim 17 in which the data includes packet data.

21. An apparatus comprising:

a first memory bank included in a memory and configured to store information from a flow of received data; and a second memory bank included in the memory and configured to store information from a flow of transmitted data, wherein the second memory bank is segregated from the first memory bank, the information stored in the first memory bank and the information stored in the second memory bank accessed in a pre determined number of accesses alternating between the first memory bank and the second memory bank.

22. The apparatus of claim 21 further comprising synchronous dynamic random access memory as the memory.

23. The apparatus of claim 21 further comprising an ingress bank as the first memory bank.

24. The apparatus of claim 21 further comprising an egress bank as the second memory bank.

25. The apparatus of claim 21 further comprising at least one additional memory bank included in the memory and configured to store information, with no memory bank being accessed twice in a row.

26. The apparatus of claim 21 in which the information stored in the first memory bank and the information stored in the second memory bank can be accessed in a pre determined number of read accesses alternating between the first memory bank and the second memory bank and, after the pre-determined number of read accesses, accessed in a pre-determined number of write accesses alternating between the first memory bank and the second memory bank.

27. The apparatus of claim 21 further comprising N partitions of M bytes each in each of the first memory bank and the second memory bank, each of the N partitions configured to store packet data.

28. The apparatus of claim 27 in which each of the N partitions is also configured to include address information and control bits related to the packet data included in the same partition as the address information.

29. A digital device comprising:

a processing mechanism configured to execute instructions; and a routing mechanism configured to store instructions capable of causing the processing mechanism to:

enable data included in a receive flow of data to be stored in a first memory bank;

enable data included in a transmit flow of data to be stared in a second memory bank, wherein the second memory bank is segregated from the first memory bank; and alternate access of data in the first memory bank with access of data in the second memory bank.

30. The digital device of claim 29 further comprising a synchronous dynamic random access including the memory banks.

31. The digital device of claim 29 in which the routing mechanism is also configured to store instructions capable of causing the processing mechanism to alternate a pre determined number of read access requests between the first memory bank and the second memory bank, and alternate a pre determined number of write access requests between the first memory bank and the second memory bank.

32. The digital device of claim 29 in which the routing mechanism is also configured to store instructions capable of causing the processing mechanism to, after a last write request to one of the memory banks, alternate between a pre-determined number of read access requests to the memory banks and a pre-determined number of write access requests to the memory banks.

33. The digital device of claim 29 in which the routing mechanism is also configured to store instructions capable of causing the processing mechanism to alternate only read requests and no write requests when alternating read requests, and alternate only write requests and no read requests when alternating write requests.

34. The digital device of claim 29 in which the routing mechanism is also configured to receive data from and transmit data to a network.

35. The digital device of claim 29 in which the data includes packet data.

36. The digital device of claim 29 in which the routing mechanism is also configured to store instructions capable of causing the processing mechanism to ignore data flow patterns to and from the memory banks in alternating requests to the memory banks.

* * * * *